W. S. SHIELDS & J. W. COX.
LIQUID CONTROLLER.
APPLICATION FILED NOV. 18, 1907.
909,340.
Patented Jan. 12, 1909.
3 SHEETS—SHEET 2.
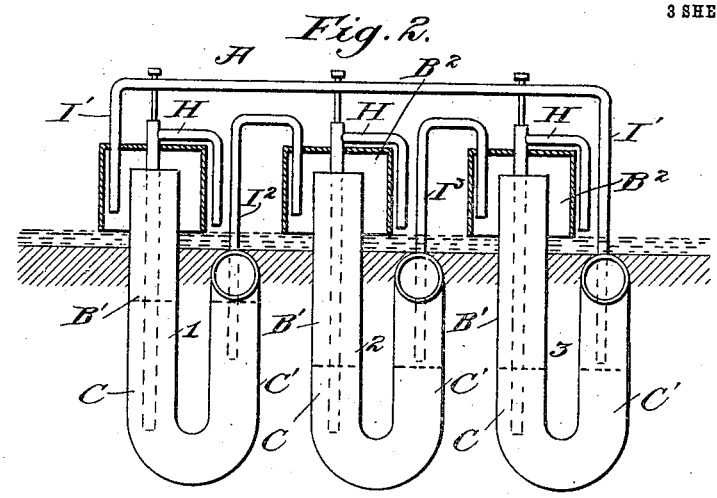
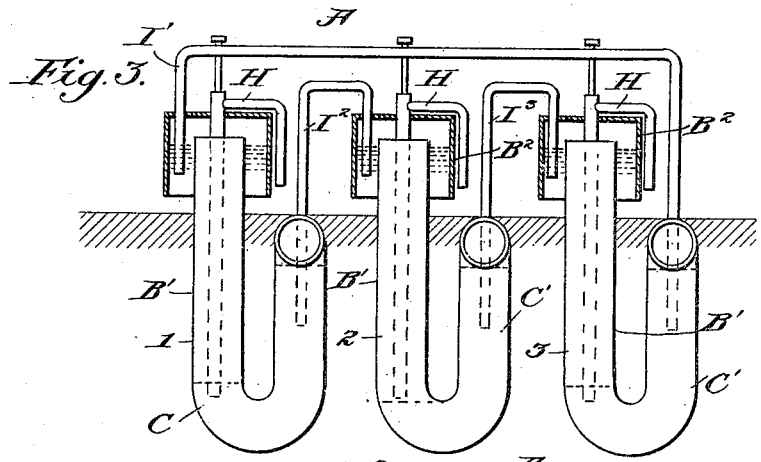
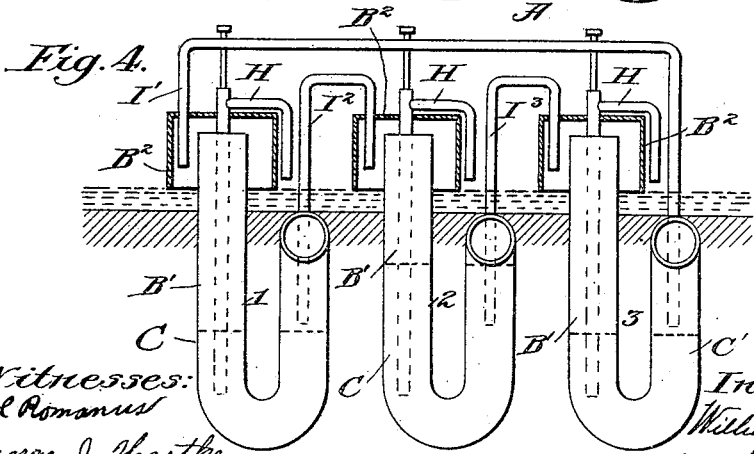
Witnesses:
Joe Romanus
George J. Hartke.
Inventors:
William S. Shields
and
James W. Cox
By D. W. Hopkins Atty.

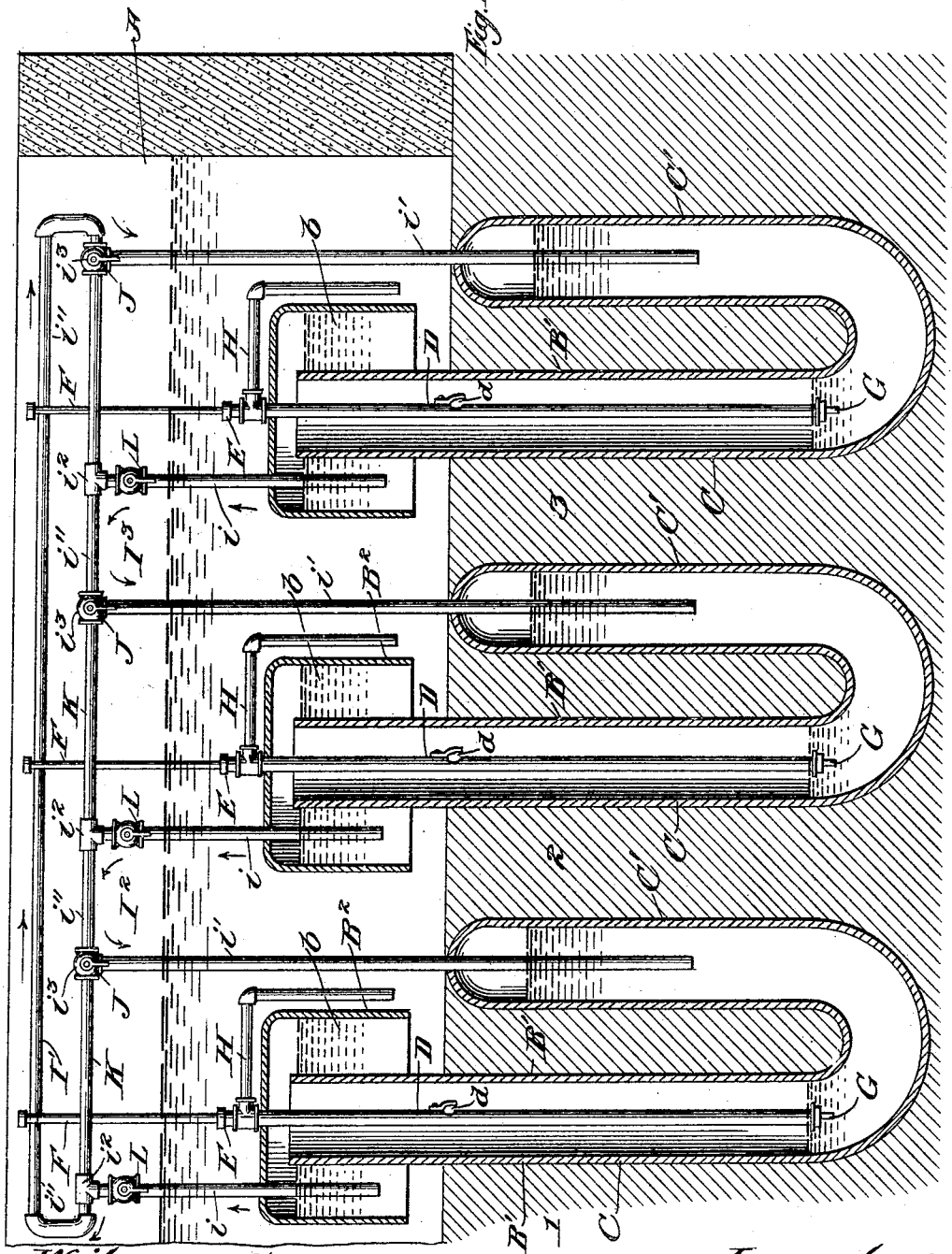

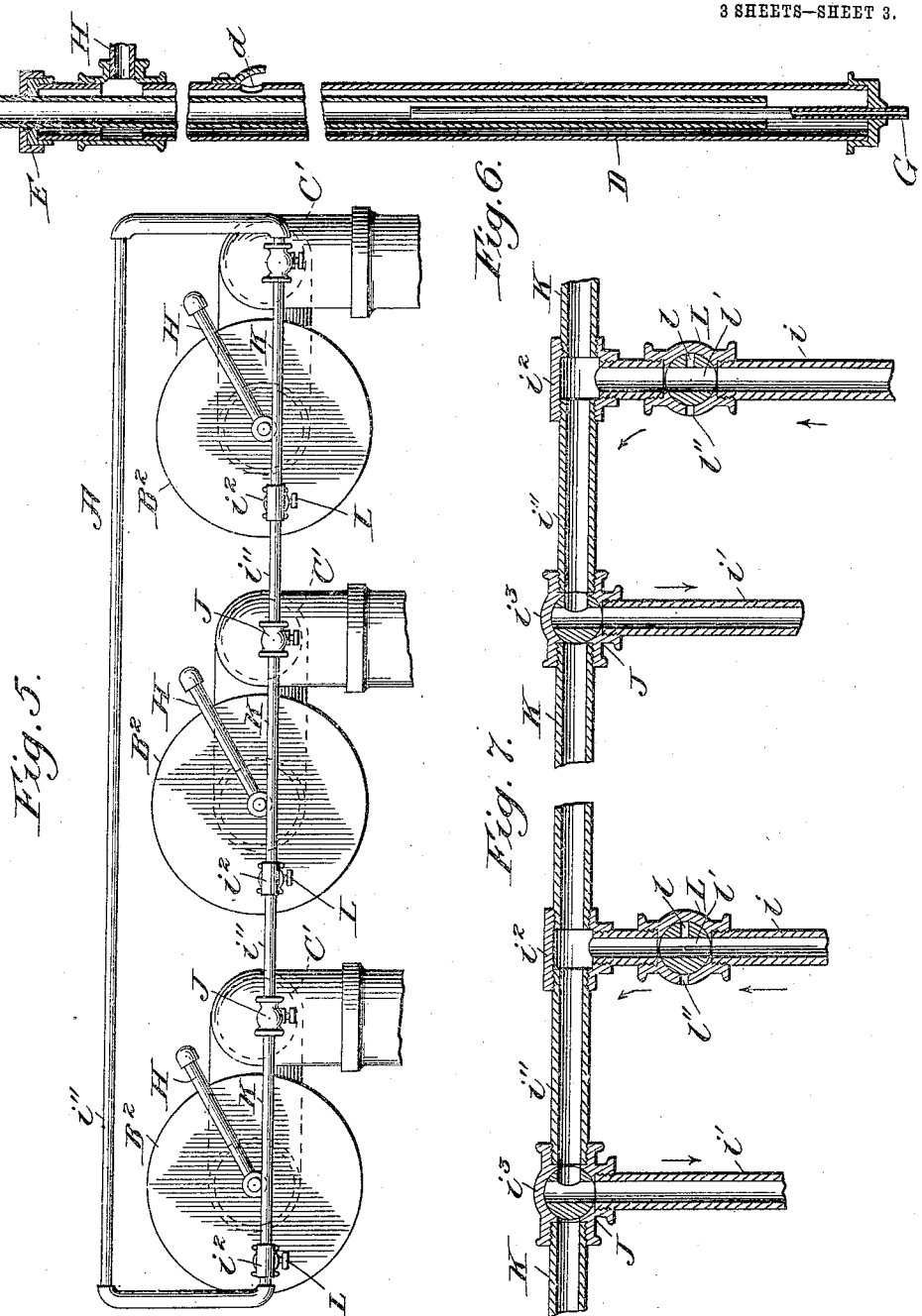

UNITED STATES PATENT OFFICE.

WILLIAM S. SHIELDS AND JAMES W. COX, OF CHICAGO, ILLINOIS, ASSIGNORS TO SAID SHIELDS.

LIQUID-CONTROLLER.

No. 909,340.  Specification of Letters Patent.  Patented Jan. 12, 1909.

Application filed November 18, 1907. Serial No. 402,703.

*To all whom it may concern:*

Be it known that we, WILLIAM S. SHIELDS and JAMES W. COX, both citizens of the United States, residing at Chicago, in the county of Cook and State of Illinois, have invented certain new and useful Improvements in Liquid-Controllers, of which the following is a specification.

The present invention relates to means for successively and rotatively putting in operation a plurality of intermittently operating siphons for the purpose of drawing from a tank or other receptacle the liquid contents thereof and discharging it into a plurality of other receptacles. A familiar instance of such a use of a siphon as is here referred to is the discharging of the contents of a dosing tank into first one and then another of a plurality of filter beds and while we have selected this application of the invention for the purpose of illustration, still we desire to have it understood that the invention is not limited to use for this particular purpose but on the contrary may be used for other purposes—in fact wherever it is desired to discharge the contents of a receptacle successively or rotatively through first one and then another of a plurality of intermittently operating siphons. By the term "intermittently operating siphon" as used in this specification, is meant a siphon having intermittent periods of action and inaction, its period of action occurring while the liquid contents of the receptacle is being drawn off and its period of inaction occurring while the receptacle is being refilled. By the term "successive or rotative operation" is meant the operation of first one and then another of a plurality of siphons, the arrangement being such that, the several siphons of the series being connected in a circuit, the operation of the last siphon of the series will condition the first siphon of the series to operate.

The object of the invention, briefly stated, is to provide a simple and improved means for bringing about this successive or alternate operation of a plurality of siphons for drawing off the liquid contents of a receptacle common to all of them and discharging it into one or another of a plurality of separate channels or receptacles.

The invention consists in the features of novelty that are hereinafter described with reference to the accompanying drawings which are made a part hereof and in which, Figure 1 is a vertical section of a liquid controller embodying the invention in its preferred form, a portion of the receptacle containing the liquid to be drawn off being also shown. Figs. 2, 3 and 4 are sectional elevations on a smaller scale of a liquid controller embodying some features of the invention and showing the levels of the liquid under different conditions at successive stages during the operations of successive siphons in the series. Fig. 5 is a plan view of the improved controller constructed as shown in Fig. 1. Fig. 6 is an enlarged vertical section of the trapped vent with which each of the siphons is provided for controlling the escape of air from it and thereby conditioning it to operate. Fig. 7 is an enlarged axial section of two of the inverted traps through which the short legs of the siphons communicate with the up-take legs of the other siphon traps.

A represents the tank or receptacle, and 1, 2 and 3 a series of siphons, all of which have their short or up-take legs, in communication with the receptacle A, while their down-take legs preferably have deep-seal traps. More particularly described, each of these siphons consists of a pipe B' which extends upward into the receptacle for a suitable distance and an inverted cup or bell B² which is placed over the upper end of the pipe B' so as to leave between the sides of the pipe and the bell an annular space $b$ which constitutes the up-take leg or short leg of the siphon. The pipe B' constitutes the long leg of the siphon and is continued downward to form the down-take leg C of a deep-seal trap, the up-take leg C' of which may discharge into any suitable channel. The structure thus far described may, as a whole, be regarded as a siphon having a sealed trap, the siphon comprising so much of the structure as is above the overflow level of the trap, while the trap comprises so much of the structure as is below said level. The invention is not, however, limited to a siphon of the particular construction shown.

In order to prevent siphonic action from taking place until the liquid in the receptacle reaches a predetermined level or head, air is trapped in the siphons, and in order to permit the siphonic action to take place when said level or head is reached one of the siphons is vented so as to permit the escape of the trapped air. For the purpose of accomplishing these two results trapped vents are preferably used, although, as will be hereinafter explained, the siphon traps alone may be used and the auxiliary trapped vents entirely dispensed with. The term "trapped vent" as here used is intended to comprehend any pipe or passage which is used to prevent the escape of the trapped air until the level or head aforesaid is reached and which is unsealed when said level is reached. We prefer, however, to use a trapped vent of the construction shown in detail in Fig. 6 and fully described in Patent No. 873,961 granted December 17, 1907 to William S. Shields, one of the present applicants.

Briefly described, the trapped vent is constructed as follows: D is a pipe passing through the top of the siphon and extending downward through the long leg of the siphon and into the down-take leg of the siphon trap. The upper end of this pipe carries a stuffing box through which passes a pipe F, both ends of which are open. The lower end of the pipe F terminates at a point between the over-flow level of the siphon trap, and the level of the bottom of the dividing wall between the two legs of the trap. The lower end of the pipe D is provided with a cap through which passes a pipe G, the lower end of which is in open communication with the interior of the siphon trap, and the upper end of which is in open communication with the interior of the pipe F, said upper end being at a level somewhat above the overflow level of the siphon trap. Above this overflow level the pipe D is provided with an opening $d$ through which the annular space between the pipes D and F is in open communication with the long leg of the siphon. At a point between the top of the siphon and the stuffing box one end of a vent pipe H communicates with the annular space between the pipes D and F, whence it proceeds outward over the top of the bell and thence downward to a level slightly above the level of the bottom of the bell its lower end being in open communication with the interior of the receptacle. Thus far we have described nothing for which any novelty is claimed in the present application.

Referring now to Figs. 2, 3 and 4, $I'$, $I^2$ and $I^3$ represent inverted U-shaped traps, the short leg of each of which is in communication with the interior of one of the siphons, while the long leg is in communication with the interior of the up-take leg of the trap of another siphon. For the sake of distinction these traps will hereinafter be termed air traps. Let it be observed that the short legs of all of the air traps terminate at the same level and that this level is slightly above the level at which the lower ends of all of the vent pipes H terminate, this level of the lower ends of the vent pipes H being in turn slightly above the level of the lower ends of the short legs of all of the siphons. Let it be observed also that the lower ends of the long legs of all of the said air traps terminate at a level below the overflow of the siphon traps but above the lowest level to which the water recedes in the up-take legs of said traps. The air trap $I^3$ provides internal communication between the siphon 3 and the up-take leg of the trap of siphon 2, the air trap $I^2$ provides communication between the interior of siphon 2 and the up-take leg of the trap of siphon 1, and the air trap $I'$ provides communication between the interior of siphon 1 and the up-take leg of the trap of siphon 3. This arrangement of siphons and air traps constitutes a complete circuit and as will appear presently the effect of it is to bring about a successive or rotative operation of the siphons from one "end" of the circuit to the other and thence back to the starting point.

The operation of the device as thus far described is as follows: Assuming that all of the siphon traps have been primed to their common overflow level, liquid is admitted to the receptacle until it nearly reaches the maximum depth or head under which it is desired to operate. As the liquid rises in the receptacle it rises also in the short legs in all of the siphons and compresses air therein. The pressure of the air depresses the level of the liquid in the down-take legs of all of the traps and a corresponding quantity of liquid will flow out of the up-take legs of said traps. When the liquid in the receptacle has nearly reached its maximum level or head and is about to force the seals of the air traps (see Fig. 1) the air is mechanically removed or allowed to escape from one of the siphons (say siphon No. 1) until it operates. The contents of the receptacle will then be drawn off through this siphon 1 and the liquid in the receptacle will fall to about the level of the lower ends of the short legs of all of the siphons as shown in Fig. 2. This unseals the revent pipes H and permits atmospheric air to enter the siphons. This in turn permits the liquid in the two legs of each siphon trap to find a common level. In the trap of siphon 1 this level will be its overflow level while in the traps of siphons 2 and 3 it will be a level slightly below the level of the lower ends of the long legs of the air traps $I^3$ and $I'$, all as shown in Fig. 2. Thus it will be seen the seal of the trap of siphon 1 will be of maximum strength, while the seals of the traps of siphons 2 and 3 will be weakened to the extent of the liquid discharged from them during the preceding filling of the tank. It will be seen also that in this condition the lower end of the long leg of the air trap $I^2$ is sealed while the lower ends of the long legs of the air traps $I'$ and $I^3$ are unsealed. After this condition is reached the receptacle will again refill. As the liquid rises, it will first seal the lower ends of the short legs of all of the siphons and thereafter, as it continues to rise, will expel air from the siphons through the revent pipes H, until the lower ends of said revent pipes are reached and sealed. Thereafter, (the long leg of the air trap I² being sealed so as to prevent the escape of air from the siphon 2,) as the liquid continues to rise in siphon No. 2, air will be compressed in said siphon 2 and acting downward upon the liquid in the down-take leg of the trap of said siphon will depress it to a corresponding extent, causing it to rise up in the up-take leg of said trap and seal the lower end of the down-take leg of the air trap I³. While the air is thus rising up in the short leg of the siphon 2 and raising the level of the liquid in the up-take leg of its trap, it will also be rising up in the short legs of the siphons 1 and 3, but since the long legs of the air traps I' and I³ remain unsealed until the liquid reaches and seals their short legs, no air will be compressed in the siphons 1 and 3.

After sealing the short legs of the air traps I' and I³, as the liquid continues to rise in the short legs of the siphons it will to a corresponding extent depress the level of the liquid in the down-take legs of the traps of all of the siphons. The result of this, as to siphon 1, will be the over-flowing of a corresponding volume of liquid from the up-take leg of the trap; as to siphon 2 it will cause a small quantity of liquid to overflow its trap and as to siphon 3 it will cause the level of the liquid in its uptake leg to reach the overflow level, or thereabouts, thus bringing about the condition shown in Fig. 3 at the instant the liquid in the receptacle reaches the maximum depth or head. That is to say, the liquid in the up-take legs of all of the siphon traps will stand at their overflow level, the liquid in the down-take legs of the traps of siphons 1 and 3 will be slightly above the common level of the lower ends of their vents, and the liquid in the down-take leg of the trap of siphon 2 will be slightly below the level last aforesaid, thereby permitting the trapped air to escape from siphon 2 and permit said siphon to operate. This difference in the levels of the liquids in the down-take legs of the siphon traps when the stage represented in Fig. 3 is reached, is due to the fact that from and after the time that the revent pipe of siphon 2 is sealed, no air can escape from the siphon 2 because the long leg of its air trap I² is sealed and hence the depression of the level of the liquid in the long leg of siphon 2 commences as soon as its revent pipe is sealed, while, by reason of the fact that the long legs of the air traps I' and I³ remain unsealed, (see Fig. 2) until after their short legs are sealed, air displaced from the siphon 1 and 3, by the rising of the liquid in their short legs, will escape until the short legs of their air traps I' and I³ are sealed. Thus, compression of air in the siphons and the consequent depression of the liquid in the down-take legs of their traps commences at an earlier period in siphon 2 than it does in siphons 1 and 3, resulting in a priority of operation of siphon 2. This condition is shown in Fig. 3. When the condition shown in Fig. 3 is reached the contents of the receptacle will be drawn off through siphon 2 and the condition shown in Fig. 4 will be established, this condition being the same as that shown in Fig. 2, excepting that the trap of the siphon 2 of Fig. 4 will have the maximum seal and the traps of the siphons 1 and 3 will have weakened seals. When the condition shown in Fig. 4 is established and the liquid again rises up in the receptacle the operations described in connection with Fig. 3 will be repeated and in like manner siphon 3 will be conditioned to operate. In like manner, siphon number 1 is next conditioned to operate, and this successive or rotative operation will continue so long as liquid is supplied to the receptacle.

Thus far we have described the invention as having air traps of the simplest form and have described no connections between the several traps, so that all of the siphons of the entire series must operate successively in the manner described. It is sometimes desirable, however, to cut out one or more of the siphons of a series in order to rest or purify the receptacle or bed into which it discharges and to this end I provide means (see Figs. 1, 5 and 7) whereby the long leg and the short leg of the air traps of two adjacent siphons may be closed and the short leg of one of said siphons placed in communication with the long leg of a third siphon of the series. As shown in Figs. 1, 5 and 7, each of the air traps comprises a short pipe $i$ constituting the short leg of the trap, a longer pipe $i'$ constituting the long leg of the trap, and a pipe $i''$ connecting the upper ends of the pipes $i$ and $i'$ through the medium of fittings $i^2$ and $i^3$. The fitting $i^2$ is a simple T-fitting while the fitting $i^3$ is a T-fitting forming the casing of a three-way valve J. The plug of this valve is of customary shape and when in one position will provide open communication between the pipes $i'$ and $i''$, while in another position it will close the pipe $i'$ and provide open communication between the pipe $i''$ which screws into one end of the fitting $i^3$ and a pipe K, one end of which screws into the fitting $i^3$ and the other end of which screws into the T-fitting $i^2$ of the next trap. The pipe $i$ is provided with a valve L having a plug of such shape that when in one position the pipe $i$ is open and when in another position said pipe is closed.

With each of the air traps thus constructed it will be seen that if all of the valves L are open and all of the valves J are set so as to connect the pipes $i'$ and $i''$ each of the air traps will operate precisely as if constructed as shown in Figs. 2, 3, and 4, each being wholly separate and independent of the other so far as its operation is concerned. Let it be assumed, however, that it is desired to cut out the siphon 2. The valve L of the air trap $I^2$ is closed so as to close the pipe $i$ and the valve J of the air trap $I^3$ is moved to a position which will close communication to the pipe $i'$ and open communication between the pipe $i''$ of the trap $I^3$ and the pipe K extending from the fitting $i^3$ to the fitting $i^2$ of the trap $I^2$. The pipe $i$ of the trap $I^3$ and the pipe $i'$ of the trap $I^2$ then become the short and long legs, respectively, of an air trap, which legs are connected by the intervening pipes $i''$ and K and the fittings $i^2$ and $i^3$.

For the purpose of venting the corresponding siphon when any of the pipes $i$ is closed, the plugs of the valves L are provided with radial vent passages $l$ disposed at right angles to the diametrical passages $l'$, and the casings are provided with leak holes $l''$ with which the passages $l'$ register when the plugs are set to close the pipes $i$.

We have described the use of trapped vents for determining the maximum level to which the liquid may rise in the receptacle before siphonic action is commenced. When the trapped vents are used, the seals of the siphon traps are superior to the seals of the traps so that the seals of the vent traps are forced before the pressure becomes sufficient to force the seals of the siphon traps. It is manifest, however, that without the sealed vents the operations above described will take place when the liquid in the receptacle rises to a level or head superior to the seals of the siphon traps.

What we claim as new and desire to secure by Letters Patent is:

1. In a liquid controller, the combination with a plurality of trapped siphons, of a plurality of air traps forming communications between the interiors of the siphons and the interiors of their traps, substantially as described.

2. In a liquid controller, the combination with a plurality of trapped siphons, of a plurality of air traps each having a short leg communicating with the interior of one of said siphons, and a long leg communicating with the trap of another of said siphons, substantially as described.

3. In a liquid controller, the combination with a plurality of trapped siphons, of a plurality of air traps each having a short leg communicating with the interior of the short leg of one of said siphons, and a long leg communicating with the up-take leg of the trap of another of said siphons, substantially as described.

4. In a liquid controller the combination, with a plurality of trapped siphons, of a plurality of air traps, each having a short leg communicating with the interior of the short leg of one of said siphons, and a long leg communicating with the interior of the up-take leg of the trap of another of said siphons at a point below its over-flow level, substantially as described.

5. In a liquid controller, the combination, with a plurality of trapped siphons and a sealed vent for the escape of air from each, of an air trap having a short leg communicating with the interior of the short leg of one of said siphons and a long leg communicating with the interior of the up-take leg of the trap of another of said siphons, substantially as described.

6. In a liquid controller, the combination, with a plurality of trapped siphons, of a plurality of air traps each having a short leg communicating with the interior of the short leg of one of said siphons and a long leg communicating with the uptake leg of the trap of another of said siphons, the short leg which communicates with the siphon at one end of the series and the long leg which communicates with the siphon trap at the other end of the series being connected, substantially as described.

7. In a liquid controller the combination, with a plurality of trapped siphons, of a plurality of air traps each having a short leg communicating with the interior of the short leg of one of said siphons, and a long leg communicating with the interior of the trap of another of said siphons, means for closing the short leg and the long leg of adjacent air traps and means for opening communication between the short leg of one of said traps and the long leg of a third trap, substantially as described.

8. In a liquid controller, the combination, with a plurality of trapped siphons, of a plurality of air traps each connecting the interior of one of said siphons with the interior of the trap of another of said siphons, means for closing the short leg and the long leg of adjacent air traps, and means for venting the closed air trap, substantially as described.

WILLIAM S. SHIELDS.
JAMES W. COX.

Witnesses:
J. SOULE WARTERFIELD,
W. D. JONES.